(12) United States Patent
Florencio et al.

(10) Patent No.: US 7,596,488 B2
(45) Date of Patent: Sep. 29, 2009

(54) SYSTEM AND METHOD FOR REAL-TIME JITTER CONTROL AND PACKET-LOSS CONCEALMENT IN AN AUDIO SIGNAL

(75) Inventors: Dinei Florencio, Redmond, WA (US); Philip Chou, Bellevue, WA (US); Li-Wei He, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 933 days.

(21) Appl. No.: 10/663,390

(22) Filed: Sep. 15, 2003

(65) Prior Publication Data

US 2005/0058145 A1    Mar. 17, 2005

(51) Int. Cl.
*G10L 19/04* (2006.01)
*G10L 21/04* (2006.01)
*G10L 11/06* (2006.01)

(52) U.S. Cl. .................. 704/208; 704/218; 704/219; 704/503; 370/516; 370/521

(58) Field of Classification Search ................. 704/208, 704/211, 214, 218, 503, 219; 370/521, 516
See application file for complete search history.

(56) References Cited

U.S. PATENT DOCUMENTS

| | | | | |
|---|---|---|---|---|
| 5,615,214 A | * | 3/1997 | Chandos et al. | 370/349 |
| 5,644,577 A | * | 7/1997 | Christensen et al. | 370/506 |
| 5,649,050 A | * | 7/1997 | Hardwick et al. | 704/203 |
| 5,689,440 A | * | 11/1997 | Leitch et al. | 370/313 |
| 6,016,503 A | * | 1/2000 | Overby et al. | 718/104 |
| 6,356,545 B1 | * | 3/2002 | Vargo et al. | 370/355 |
| 6,377,931 B1 | * | 4/2002 | Shlomot | 704/503 |
| 6,453,287 B1 | * | 9/2002 | Unno et al. | 704/219 |
| 6,625,656 B2 | * | 9/2003 | Goldhor et al. | 709/231 |
| 7,058,569 B2 | * | 6/2006 | Coorman et al. | 704/216 |
| 7,065,485 B1 | * | 6/2006 | Chong-White et al. | 704/208 |
| 7,324,444 B1 | * | 1/2008 | Liang et al. | 370/230 |

(Continued)

OTHER PUBLICATIONS

Sungjoo Lee, et al., "Variable Time-Scale Modification of Speech using Transient Information" Acoustics, Speech, and Signal Processing, 1997. ICASSP-97., 1997 IEEE International Conference on Munich, Germany Apr. 21-24, 1997, Los Alamitos, CA, USA,IEEE Comput. Soc, vol. 2, pp. 1319-1322.

(Continued)

*Primary Examiner*—Martin Lerner
(74) *Attorney, Agent, or Firm*—Lyon & Harr, LLP; Mark A. Watson

(57) ABSTRACT

An "adaptive audio playback controller" operates by decoding and reading received packets of an audio signal into a signal buffer. Samples of the decoded audio signal are then played out of the signal buffer according to the needs of a player device. Jitter control and packet loss concealment are accomplished by continuously analyzing buffer content in real-time, and determining whether to provide unmodified playback from the buffer contents, whether to compress buffer content, stretch buffer content, or whether to provide for packet loss concealment for overly delayed or lost packets as a function of buffer content. Further, the adaptive audio playback controller also determines where to stretch or compress particular frames or signal segments in the signal buffer, and how much to stretch or compress such segments in order to optimize perceived playback quality.

21 Claims, 7 Drawing Sheets

U.S. PATENT DOCUMENTS

| | | | |
|---|---|---|---|
| 7,337,108 B2* | 2/2008 | Florencio et al. | 704/208 |
| 7,346,005 B1* | 3/2008 | Dowdal | 370/252 |
| 7,412,376 B2* | 8/2008 | Florencio et al. | 704/206 |
| 7,426,470 B2* | 9/2008 | Chu et al. | 704/503 |
| 7,450,601 B2* | 11/2008 | Sundqvist et al. | 370/412 |
| 7,526,351 B2* | 4/2009 | He et al. | 700/94 |
| 2003/0033140 A1 | 2/2003 | Taori et al. | 704/214 |
| 2003/0219014 A1* | 11/2003 | Kotabe et al. | 370/375 |
| 2003/0235217 A1* | 12/2003 | Verreault | 370/519 |
| 2004/0120309 A1* | 6/2004 | Kurittu et al. | 370/352 |
| 2006/0209955 A1* | 9/2006 | Florencio et al. | 375/240.12 |

OTHER PUBLICATIONS

Veldhuis R. et al., "Time-scale and pitch modifications of speech signals and resynthesis from the discrete short-time Fourier transform" Speech Communication, Elsevier Science Publishers, Amsterdam, NL, Jul. 24, 1997, vol. 18, Nr. 3, pp. 257-279.

Liang Y J; Faerber N; Girod B, "Adaptive playout scheduling using time-scale modification in packet voice communications," 2001 IEEE International Conference on Acoustics, Speech, and Signal Processing. Proceedings. (ICASSP). Salt Lake City, UT, May 7-11, 2001, IEEE International Conference on Acoustics, Speech, and SIgnal Processing (ICASSP), New York, NY : IEEE, US, vol. 3 of 6, pp. 1445-1448.

Macon M W; Clements M A, "Sinusoidal Modeling and Modification of Unvoiced Speech," IEEE Transactions on Speech and Audio Processing, IEEE Inc. New York, US, Nov. 1997, vol. 5, Nr. 6, pp. 557-560.

Malah D, "Time-Domain Algorithms for Harmonic Bandwidth Reduction and Time Scaling of Speech Signals," IEEE Transactions on Acoustics, Speech and Signal Processing, IEEE Inc. New York, US, Apr. 1979, vol. ASSP-27, Nr. 2, pp. 121-133.

Moulines E; LaRoche J., "Non-parametric Techniques for Pitch-Scale Modification of Speech," Speech Communication, Elsevier Science Publishers, Amsterdam, NL, Feb. 1995, vol. 16, Nr. 2, pp. 175-205.

Ejaz Mahfuz, "Packet Loss Concealment for Voice Transmission over IP Networks," Master Thesis, Department of Electrical Engineering, McGill University, Montreal, Canada, Sep. 27, 2001.

Wen-Tsai Liao; Jeng-Chun Chen; Ming-Syan Chen, "Adaptive Recovery Techniques for Real-Time Audio Streams," Proceedings IEEE INFOCOM 2001. The Conference on Computer Communications. 20th. Annual Joint Conference of the IEEE Computer Andcommunications Societies. Anchorage, AK, Apr. 22-26, 2001, Proceedings IEEE INFOCOM. The Conference on Computer Communications, New York, NY : IEEE, US, vol. 1 of 3. Conf. 20, pp. 815-823.

R. Ramjee, J. Kurose and D. Towsley, 'Adaptive playout mechanisms for packetized audio applications in wide-area networks,' Proc. of INFOCOM'94, vol. 2, pp. 680-688, Jun. 1994.

Y. Liang, N. Farber, and B.Girod, "Adaptive playout scheduling and loss concealment for voice communication over IP networks," *IEEE Transactions on Multimedia*, Apr. 2001.

* cited by examiner

SYSTEM AND METHOD FOR REAL-TIME JITTER CONTROL AND PACKET-LOSS CONCEALMENT IN AN AUDIO SIGNAL

BACKGROUND

1. Technical Field

The invention is related to receipt and playback of packet-based audio signals, and in particular, to a system and method for providing automatic jitter control and packet loss concealment for audio signals broadcast across a packet-based network or communications channel.

2. Related Art

Conventional packet communication systems, such as the Internet or other broadcast network, are typically lossy. In other words, not every transmitted packet can be guaranteed to be delivered either error free, on time, or even in the correct sequence. Further, any delay in delivery time is usually variable. If the receiver can wait for packets to be retransmitted, correctly ordered, or corrected using some type of error correction scheme, then the fact that such networks are inherently lossy and delay prone is not an issue. However, for near real-time applications, such as, for example, voice-based communications systems across such packet-based networks, the receiver can not wait for packets to be retransmitted, correctly ordered, or corrected without causing undue, and noticeable, lag or delay in the communication.

Many conventional schemes address minor delays in packet delivery time by simply providing a temporary buffer of received packets in combination with a delayed playback of the received packets. Such schemes are typically referred to as "jitter control" schemes. In general, most such schemes address delay in packet receipt by using a "jitter buffer" or the like which temporarily stores incoming packets or signal frames and provides them to a decoder with sufficient delay that one or more subsequent packets should have already been received. In other words, the jitter buffer simply keeps one or more packets in a buffer for delaying playback of the incoming signal for a period long enough to ensure that a majority of packets are actually received before they need to be played.

A sufficient increase in the length of the buffer allows virtually all packets to be received before they need to be played back. In fact, if the size of the jitter buffer is at least as long as the difference between the smallest and largest possible packet delays, then all packets could be played without any apparent gap or delay between packets. Unfortunately, as the length of the buffer increases, playback of the signal increasingly lags real-time. In a one-way audio signal, such as a music broadcast, for example, this is typically not a problem. However, in systems such as real-time or two-way conversations, temporal lag resulting from the use of such buffers becomes increasing apparent, and undesirable, as the buffer length increases.

In addition, the basic idea of using a buffer has been improved in many modern communications systems by using compression and stretching techniques for providing temporal adjustment of the playback duration of signal frames. As a result, the jitter buffer length can be adapted during speech utterances by stretching or compressing the currently playing audio signal, as necessary, for reducing the average delay without incurring as many late losses. Unfortunately, the use of temporal stretching and compression techniques for frames in an audio signal often results in audible artifacts which may be objectionable to the human listener.

An additional conventional technique, commonly referred to as "packet loss concealment" has also been used to improve the perceived speech quality. For example, as noted above, packet loss may occur when overly delayed packets are not received in time for playback. Typically, such overly delayed packets are referred to as "late loss" packets. Similarly, packet loss may also occur simply because the packet was never received. Conventional packet loss concealment schemes typically address such overly delayed and lost packets in the same manner by using some sort of packet loss concealment technique.

Further, many such schemes provide a combination of both jitter control and packet loss concealment. With respect to jitter control, most schemes determine the size of the jitter buffer by determining a minimum buffer size as a compromise between late or actual loss and packet delay. Further, a number of conventional schemes offer some sort of network analysis for further optimizing buffer size for minimizing delay and maximizing timely packet receipt. Packets that are determined to be late loss packets are typically handled in the same way as if they were actually lost. In fact, actually lost packets are typically declared to be a late loss anyway, as whatever delay criteria is used for determining a late loss will also be met by an actually lost packet. In either case, conventional decoders implement some sort of error concealment to hide the fact that the packet that should be played has not been received.

One conventional scheme uses both jitter control and packet loss concealment. In general, this scheme minimizes the length of the jitter buffer by allowing each packet to be stretched and/or compressed, as needed to account for delayed packet receipt while still maintaining one or more packets in the jitter buffer. In particular, this scheme first introduces a one-packet delay, in order to wait for a packet to be either received, or declared lost, before deciding on whether the packet to be played currently should be stretched or compressed. Further, this scheme analyzes network performance on an ongoing basis to determine whether packets scheduled to be played in the near future are likely to be received on time. Received packets are then stretched or compressed, as necessary, to ensure that the buffer is not empty before the next scheduled packet arrival time.

However, when a packet does not arrive by the scheduled time, it is declared to be a late loss, and error concealment is then used to hide that loss. Most modern schemes use some form of stretching and compression in combination with a windowing technique for merging boundaries of packets bordering missing packets declared to be late loss packets. In general, such schemes typically operate by decomposing input packets input into overlapping segments of equal length. These overlapping segments are then realigned and superimposed via a conventional correlation process along with smoothing of the overlap regions to form an output segment having a degree of overlap which results in the desired output length. The result is that the composite segment is useful for hiding or concealing perceived packet delay or loss. Unfortunately, such schemes typically make packet-based decisions regarding whether a packet is to be declared as late loss. Consequently, such schemes often declare packets to be a late loss when they are actually received in sufficient time that they could have been played as a part of the signal playback.

Therefore, what is needed is a system and method that provides for both jitter control and packet loss concealment. This scheme should minimize buffer length, and thus delay, while also minimizing any artifacts resulting from either stretching or compression of audio segments. Further, rather than using a simple packet-based determination for deciding late loss for particular packets, the decision should be made as a function of buffer content for reducing overall buffer size and delay.

SUMMARY

Jitter control and packet loss concealment are two well-known techniques for improving the quality of signals transmitted across lossy and delay prone packet-based networks such as the Internet and other conventional voice-based communications channels. Clearly, signal quality and system performance improves as a function of both reduced delay and reduced signal artifacts. Thus, to address the need for high quality audio jitter control and packet loss concealment, an "adaptive audio playback controller" is provided for performing automatic buffer-based adaptive jitter control and packet loss concealment for audio signals transmitted across a packet-based network as a function of buffer content. Further, the de-jittering and packet loss concealment processes described herein are compatible with most conventional codecs for decoding and providing a playback of audio signals.

In general, the adaptive audio playback controller operates by first using a conventional codec for decoding and reading transmitted signal frames into a signal buffer as soon as those frames have been received. Samples of the decoded audio signal are then played out of the buffer according to the needs of the player device. Note that the size of the input frame read into the buffer and the size of the output frame (i.e., the sample output to the player device) do not need to be the same. Input frame size is determined by the codec, and some codecs use larger frame sizes to save on bitrate. Output frame size is determined by the buffering system on the playout or playback device. For example, in a tested embodiment, a 10 ms output frame was used in combination with a 20 ms input frame. However, rather than simply playing back the frames, the adaptive audio playback controller stretches or compresses the content of the buffer, as necessary, to perform real-time jitter control and packet loss concealment as a function of buffer content rather than a function of expected packet receipt time as with conventional schemes.

Primary components of the de-jittering processes include buffer analysis, adaptive signal stretching processes, and adaptive signal compression processes. These processes operate based on a maximum and minimum buffer size. In a tested embodiment, a 10 ms minimum buffer size was used to guarantee enough data is present in the buffer to allow for good quality stretching. In contrast, the maximum buffer size is designed as a tradeoff between minimizing the probability that any given sample will need to be stretched, and the delay resulting from increased buffer size. For example, in one embodiment, maximum buffer size was determined by performing a conventional statistical modeling of the broadcast channel or network, and setting the maximum buffer size at a level that will guarantee receipt of at least a minimum threshold number of data packets, such as, for example, 95% of the packets, before those packets are needed for playback. Methods for performing such statistical modeling of packet receipt across a network channel are well known to those skilled in the art, and will not be described in detail herein.

As noted above, one of the components of the adaptive audio playback controller involves a signal stretching process. Conventional signal stretching schemes typically stretch a received frame of the audio signal until the time scheduled for arrival of the next packet. However, these schemes will declare a packet as a "late loss" when it is not received within a certain predetermined period of time. For example, such schemes typically set a time limit for receiving a packet n that expires soon after the time a prior packet, i.e., packet n−1, was received. If packet n is not received by that predetermined time, a late loss is declared, and "loss concealment" techniques are then used for concealing that loss. Thus, such schemes are packet-based.

In contrast, the adaptive audio playback controller described herein operates as a function of buffer content rather than packet receipt time. For example, unlike conventional stretching schemes, the audio playback controller begins stretching the contents of the buffer whenever a particular packet, e.g., packet n, has not arrived by the expected or scheduled time. In this case, the signal existing in the buffer is stretched until the delayed packet arrives, or until it is eventually declared "lost." This differs from conventional stretching processes in that rather than immediately declaring a packet as a "late loss" when it is not received within a predetermined period of time, the contents of the buffer are stretched while simultaneously determining an appropriate time limit for declaring that packet to be a late loss as a function of the current buffer contents. Furthermore, the receipt of a subsequent packet (e.g., packet n+1, where packet n represents the expected packet) will change this time limit. Consequently, the adaptive audio playback controller provides a significantly increased packet receipt time prior to declaring a late loss for any given packet. As a result, packet "late loss" is significantly reduced, thereby resulting in a significantly reduced use of packet loss concealment processes for reducing artifacts in the signal, and a perceptibly cleaner signal playback. Further, and more importantly, the increased packet receipt time does not come at the cost of increased signal delay.

In particular, rather than setting a time limit for declaring packet loss, the adaptive audio playback controller simply waits for the next packet to be received, or until one of several "loss conditions" are satisfied, as described below. For example, one such loss condition is to set a maximum delay time for packet receipt. Given a sufficiently long delay time T, late loss will only be declared in relatively extreme delay cases, when a signal connection was lost, or when a talk spurt has ended in the case where no information is sent about the end of the talk spurt. In a tested embodiment, values for the delay time T on the order of about 20 ms to about 1 sec were used, with values of T around 100 ms typically providing good results.

A second loss condition relates to receiving a subsequent packet prior to receiving the next expected packet in the transmission. Typically, this results from either packet inversion, or actual packet loss. As noted above, conventional schemes typically will generally ignore packet arrival order, and wait the maximum amount regardless of whether a subsequent packet has been received or not. In contrast, the adaptive audio playback controller reduces the time required to declare a late loss whenever a subsequent packet is received prior to receiving the expected packet. However, to minimize any declarations of "late loss" due to packet inversion, the adaptive audio playback controller still waits for some time before declaring a loss, even if a subsequent packet has already been received. On the other hand, since packet inversions are rare, the waiting is kept to a minimum, in order to avoid introducing additional artifacts in the signal. More specifically, the signal in the buffer will not be stretched beyond the period that the buffered signal would be stretched in the case where a packet loss would be declared, as noted above. Once that time has been reached, the packet n is declared as lost, and the packet loss concealment processes described herein are used to reduce or eliminate artifacts in the signal.

As noted above, signal stretching is used to compensate for delayed or lost packets. On the other hand, signal compression is used to address the case where the signal buffer has become too full, with a resulting increase in signal delay. Therefore, by compressing the signal contained in the buffer, playback time of the buffered signal is reduced, the buffer is at least partially emptied, and the signal playback delay is reduced. As described herein, when compressing the signal, it is typically a good idea to wait for a segment of speech where compression is expected to produce little or no artifacts, rather than simply compress the next segment to be played out. One simple solution is to compress only in between talk spurts. However, a better process considers how much compression is desired (i.e., how far behind in time signal playback is), and how easy it is to compress a particular segment while minimizing artifacts. Further, the need to compress the buffer implies that a long signal segment is in the buffer, and that therefore there is some freedom on where to compress the signal.

The selection of which segments to actually compress in any given frame or frames is an important decision, as it typically affects the perceived quality of the reconstructed signal for a human listener. For example, rather than compress all segments of a given frame equally, better results are typically achieved by employing a hierarchical or layered approach to compression. In particular, in an audio signal including speech, each segment of a frame will be either a "voiced" segment, which is dominated by quasi-periodic speech, an "unvoiced" segment, dominated by aperiodic speech or other signals, or a "mixed" segment which includes both periodic and aperiodic components. Given the determination of segment type in the buffer, the desired compression is achieved in any given frame or frames by first compressing particular segment types in a preferential hierarchical order.

For example, compressing segments that represent speech, silence or simple noise, while avoiding compression of unvoiced segments or transients, produces a reconstructed signal having less perceivable artifacts. If sufficient compression cannot be accomplished by compressing segments representing speech, silence or simple noise, then non-transitional unvoiced segments are compressed in the manner described above. Finally, segments including transitions are compressed if sufficient compression can not be achieved through compression of the voiced segments or non-transitional unvoiced segments. This hierarchical approach to compression serves to limit perceivable artifacts in the reconstructed signal.

In view of the above summary, it is clear that the adaptive audio playback controller provides a unique system and method for providing buffer-based jitter control and packet loss concealment via adaptive stretching and compression of frames of a received audio signal while minimizing perceivable artifacts in a reconstruction of that signal. In addition to the just described benefits, other advantages of the system and method for providing buffer-based jitter control and packet loss concealment for a received audio signal will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
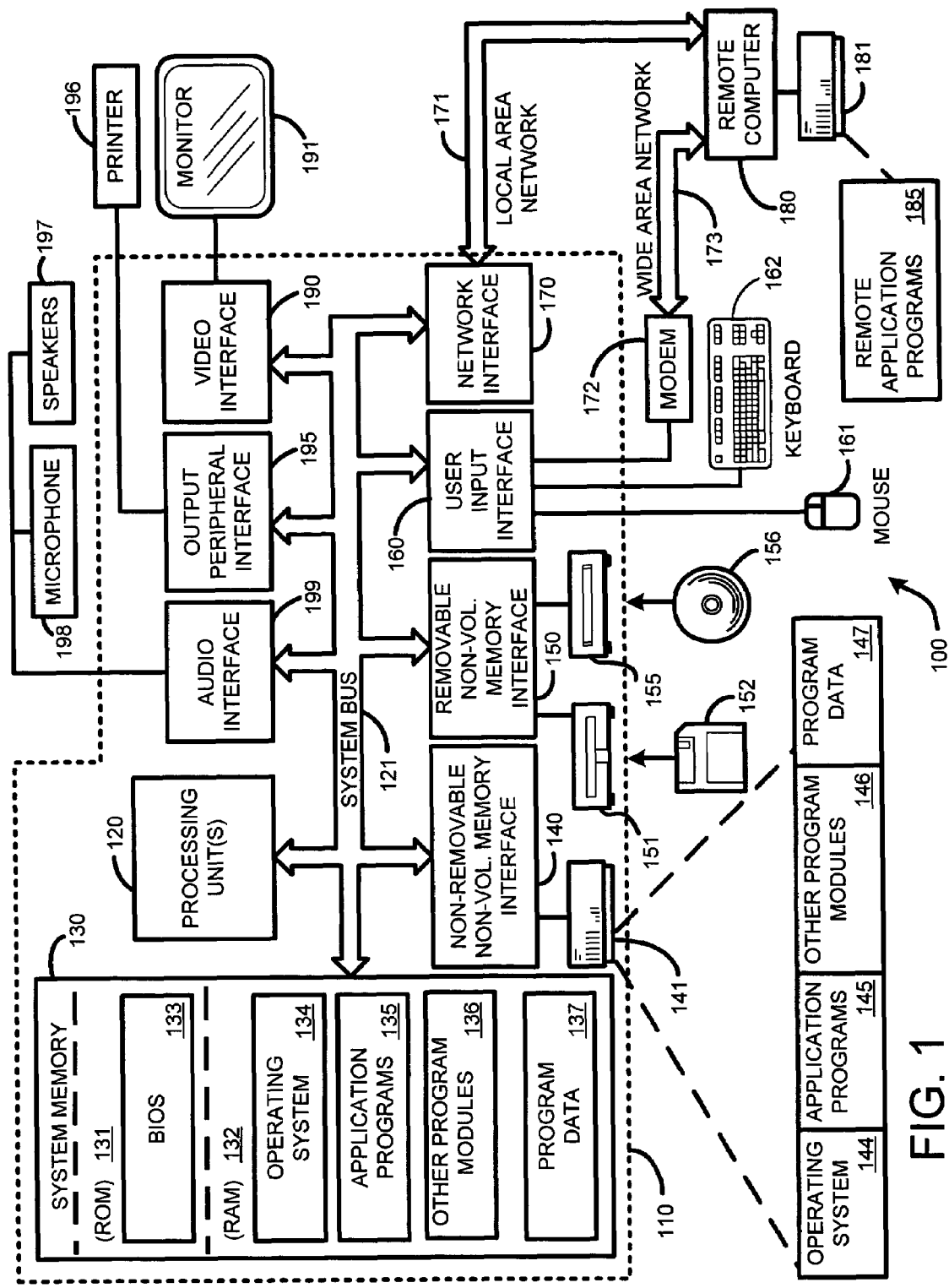
FIG. 1 is a general system diagram depicting a general-purpose computing device constituting an exemplary system for providing adaptive buffer-based jitter control and packet loss concealment for playback of an audio signal.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

In addition, the computer 110 may also include a speech input device, such as a microphone 198 or a microphone array, as well as a loudspeaker 197 or other sound output device connected via an audio interface 199. Other input devices (not shown) may include a joystick, game pad, satellite dish, scanner, radio receiver, and a television or broadcast video receiver, or the like. These and other input devices are often connected to the processing unit 120 through a user input interface 160 that is coupled to the system bus 121, but may be connected by other interface and bus structures, such as, for example, a parallel port, game port, or a universal serial bus (USB). A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying an "adaptive audio playback controller" for performing automatic buffer-based adaptive jitter control and packet loss concealment for audio signals transmitted across a packet-based network as a function of buffer content.

2.0 Introduction:

Jitter control, or de-jittering, and packet loss concealment has been used for a number of years for improving the perceived playback quality of speech-based signals transmitted across lossy and delay prone packet-based networks such as the Internet or other communications network. An adaptive audio playback controller, as described herein provides for reduced signal delay time, improved jitter control, and improved packet loss concealment through use of a buffer-content based process for determining when and where particular frames or audio segments are to be stretched or compressed, and when to apply loss concealment techniques so as to minimize packet loss and artifacts resulting from such packet loss.

In general, the adaptive audio playback controller operates by first using a conventional codec for decoding and reading received packets into a signal buffer as soon as those packets have been received and decoded into signal frames. Samples of the decoded audio signal are then played out of the signal buffer according to the needs of the player device. Jitter control and packet loss concealment are accomplished by continuously analyzing buffer content in real-time, and determining whether to provide unmodified playback from the buffer contents, whether to compress buffer content, stretch buffer content, or whether to provide for packet loss concealment for overly delayed or lost packets. Further, in addition to automatically determining whether to provide straight playback, or processed playback (compression, stretching, or packet loss concealment), the adaptive audio playback controller also determines where to stretch or compress particular frames or signal segments in the signal buffer, and how much to stretch or compress such segments in order to optimize perceived playback quality. The frames, either processed or unmodified, are then provided for immediate playback, as needed by a playback device.

2.1 System Overview:

The adaptive audio playback controller provides for automatic buffer-based adaptive jitter control and packet loss concealment for audio signals transmitted across a packet-based network as a function of buffer content. Primary components of the de-jittering processes include buffer analysis, adaptive signal stretching, and adaptive signal compression. These components operate based on a maximum and minimum buffer size. The minimum buffer size is determined by choosing a buffer size that will guarantee enough data is present in the buffer to allow for good quality stretching. In contrast, the maximum buffer size is designed as a tradeoff between minimizing the probability that any given sample will need to be stretched, and the delay naturally resulting from increased buffer size. Typically, this choice is made as a function of network performance characteristics such as loss rates and packet delay times.

As noted above, the primary components of the adaptive audio playback controller include a buffer analysis process. This buffer analysis process examines the content of the signal buffer for determining whether to provide unmodified playback from the buffer contents, whether to compress buffer content, stretch buffer content, or whether to provide for packet loss concealment for overly delayed or lost packets.

The signal stretching processes described herein are used to increase the playback time of one or more signal segments as a way of providing additional time in which to receive delayed signal packets across the network. Unlike conventional signal stretching schemes which will declare a packet as a "late loss" when it is not received within a certain predetermined period of time, the adaptive audio playback controller operates as a function of buffer content rather than packet receipt time.

Therefore, unlike conventional stretching schemes, the audio playback controller begins stretching the contents of the buffer whenever a particular packet, e.g., packet n, has not arrived by the expected or scheduled time. In this case, the signal existing in the buffer is stretched until the delayed packet arrives, or until it is eventually declared as "lost" based on one or more predetermined loss conditions, as described below. This differs from conventional stretching processes in that rather than immediately declaring a packet as a "late loss" when it is not received within a predetermined period of time, the contents of the buffer as well as the amount of stretching already performed and the possible arrival of subsequent packets are all used to determine an appropriate time for declaring that packet to be a late loss.

In general, the stretching process is used to locate, create, or estimate samples that are inserted into the existing signal. These samples are then blended with the original signal content using a windowing process to hide or minimize any perceivable artifacts that would otherwise exist at the boundary points between the inserted samples and the original signal content. However, the type of windowing process used, and the methods for locating, creating or estimating samples for stretching, is dependent upon the content type of the frames in the buffer, i.e., "voiced frames," "unvoiced frames," or "mixed frames."

For example, in an audio signal including speech, each segment of any particular frame will be either a "voiced" segment that includes quasi-periodic speech or some other quasi-periodic signal, an "unvoiced" segment which does not include any significant periodicity, or a "mixed" segment which includes both periodic and aperiodic components. Then, in order to achieve optimal results, stretching that is specifically targeted to the particular segment type, i.e., voice, unvoiced, or mixed, is applied.

The packet loss concealment processes described herein work in cooperation with the signal stretching processes to address late loss of packets by attempting to hide such losses when necessary. In particular, once it is determined that a packet is lost, the system will no longer wait for that packet to be received. Loss concealment then takes the form of either a "mute mode," or of a "loss concealment mode." In particular, the mute mode is used to hide packet losses where a maximum delay time has been exceeded without receiving any packets. In contrast, the loss concealment mode is used to hide packet losses where the delay time has not been exceeded, but wherein the buffer has already been stretched and a subsequent packet has already been received.

In one embodiment, muting provided by the mute mode is implemented gradually so as to minimize audible artifacts in the signal. Further, in another embodiment, the signal is not entirely muted, but is instead reduced to a "comfort noise" level that is computed for simulating a noise level similar to any noise that was present when the connection was active, but when there was no speech. Consequently, signal loss is not readily apparent to the listener. This is important for maintaining apparent signal quality in lossy networks where the signal may be lost and reestablished a number of times during a typical communication session.

In general, the packet loss concealment mode operates by first determining the number of signal samples that need to be inserted between current buffer content and future buffer content. In other words, this computation determines the number of samples that need to be used to fill the hole caused by a packet loss existing between a current signal frame and a future signal frame that have already been received into the signal buffer. In one embodiment, given the computed number of samples, stretching is divided between the current and future buffer content as a function of the average energy of that buffer content, with lower energy signal frames being preferentially stretched over higher energy frames so as to minimize signal artifacts.

The signal compression processes described herein are provided to address the case where the signal buffer has become too full, with a resulting increase in signal delay. Therefore, by compressing the signal contained in the buffer, playback time of the buffered signal is reduced, the buffer is at least partially emptied, and the signal playback delay is reduced. As described herein, when compressing the signal, the signal is examined to identify a segment of the signal wherein compression is expected to produce little or no artifacts, rather than simply compressing the next segment to be played out.

Further, rather than compress all segments of a given frame equally, better results are typically achieved by employing a hierarchical or layered approach to compression. In particular, in an audio signal including speech, each segment of a frame will be either a "voiced", an "unvoiced", or a "mixed" segment, as previously described. Given the determination of segment type in the buffer, the desired compression is achieved in any given frame or frames by first compressing particular segment types in a preferential hierarchical order.

Figure 2:
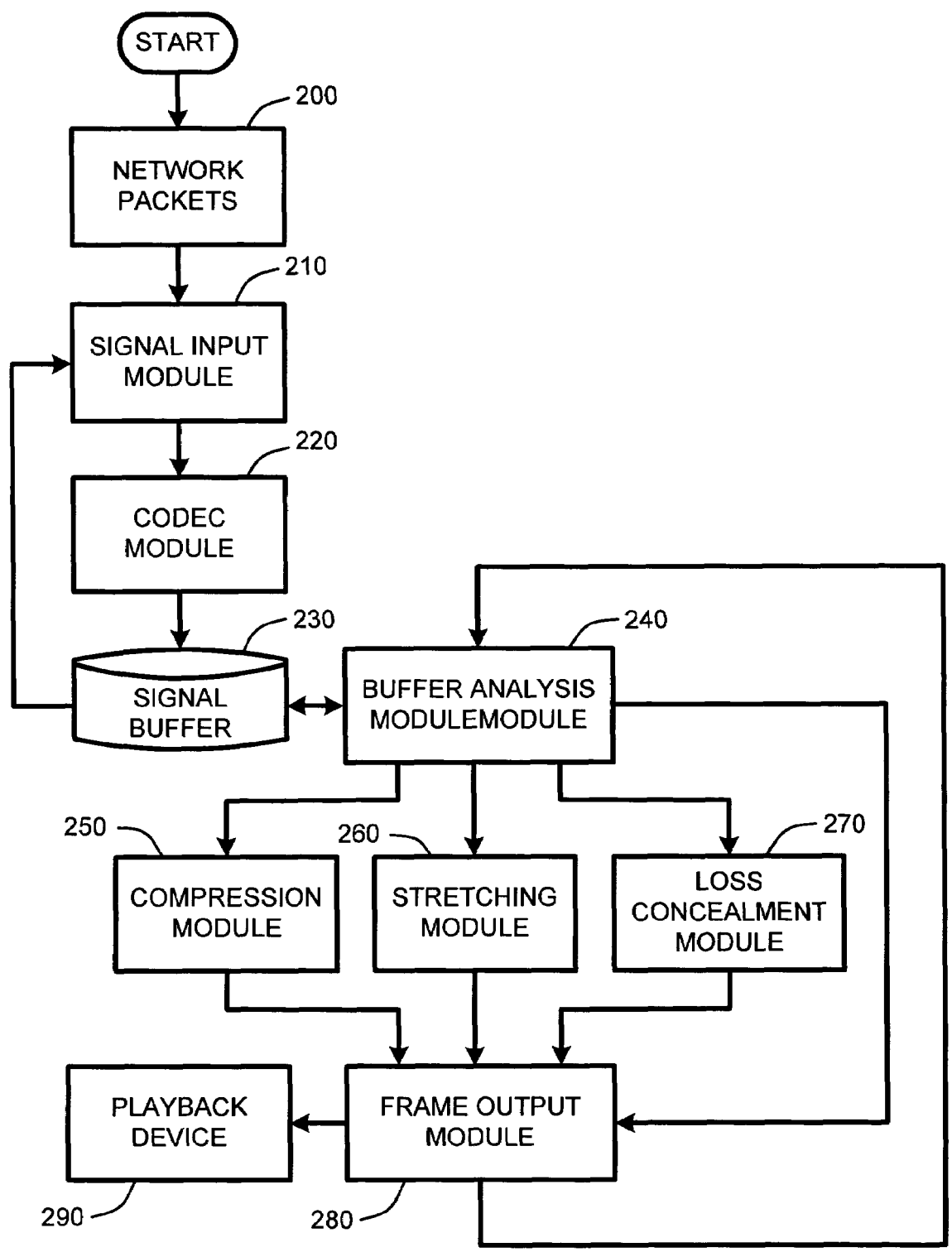
FIG. 2 illustrates an exemplary architectural diagram showing exemplary program modules for adaptive buffer-based jitter control and packet loss concealment for playback of an audio signal.

2.2 System Architecture:

The processes summarized above are illustrated by the general system diagram of FIG. 2. In particular, the system diagram of FIG. 2 illustrates the interrelationships between program modules for implementing an adaptive audio playback controller for providing adaptive buffer dependent jitter control and packet loss concealment for an audio signal received across a packet-based network. It should be noted that any boxes and interconnections between boxes that are represented by broken or dashed lines in FIG. 2 represent alternate embodiments of the temporal audio scalar described herein, and that any or all of these alternate embodiments, as described below, may be used in combination with other alternate embodiments that are described throughout this document.

As illustrated by FIG. 2, a system and method for adaptive buffer dependent jitter control and packet loss concealment begins by receiving a stream of network packets 200 across a packet-based network. These packets 200 are received by a signal input module 210. This signal input module 210 then provides the received packets to a codec module 220 which uses the appropriate conventional decoder to decode the received packets 200 into one or more signal frames. These decoded signal frames are then stored in a signal buffer 230 as soon as they have been decoded. This process for receiving network packets 200 via the signal input module 210, decoding those packets 220, and storing the packets into the signal buffer 230 continues for as long as receipt of network packets 200 continues.

However, the signal buffer 230 does not continue to fill up during this time. In fact, frames are read out of the buffer, on an as-needed basis, as quickly as possible so as to minimize buffer delay. However, rather then simply read the frames out of the buffer 230 for playback, a buffer analysis module 240 is used to examine the contents of the buffer for the purpose of determining whether to provide unmodified playback from the buffer contents, whether to compress buffer content, stretch buffer content, or whether to provide for packet loss concealment for overly delayed or lost packets. The buffer contents, whether or not modified are then gradually output for playback on a conventional playback device. Besides standard computers, such playback devices also include wired and wireless telephones, cellular telephones, radio devices, and other packet-based communications systems or devices operable over a packet-based network.

In general, the determination of how to process the frames in the signal buffer 230 is a function of buffer content. For example, where the buffer 230 is full or nearly full, and there are no missing frames, each desired output frame is simply provided directly from the signal buffer 230 to a frame output module 280 for playback on a playback device 290.

In the case where the size of the signal buffer 230 is too small, e.g., because one or more expected packets have not yet been received, but have not yet been declared as lost, then one or more frames possibly present in the signal buffer are stretched via a stretching module 260 using a content-type specific stretching process so as to minimize any artifacts that might be perceived by a human listener. This stretching process is described in further detail below in Section 3.3. The stretching then continues for as long as needed until receipt of the next frame for playback, or until the delayed packet is declared to be lost, i.e., a "late loss" packet.

In the case where the signal buffer 230 is too full, i.e., the buffer exceeds a predetermined maximum threshold length, and then one or more segments of the signal buffer are compressed by a compression module 250. This compression module 250 uses a novel hierarchical frame compression process for temporal compression of one or more signal frames.

A loss concealment module 270 is used to address the case where one or more packets are declared to be a late loss. In this case, packet loss concealment is used to hide or minimize artifacts that will result from either joining non-contiguous segments of the audio signal, or from blending new samples into the existing content of the signal buffer 230 for the purpose of filling any "holes" left in the signal as a result of packet loss or undue delay.

3.0 Operation Overview:

The above-described program modules are employed in the adaptive audio playback controller. As summarized above, this adaptive audio playback controller provides for automatic buffer-based adaptive jitter control and packet loss concealment for audio signals transmitted across a packet-based network as a function of buffered signal content. Further, the de-jittering and packet loss concealment processes described herein are compatible with most conventional codecs for decoding and providing a playback of audio signals. The following sections provide a detailed operational discussion of exemplary methods for implementing the program modules described in Section 2.

In general, the adaptive audio playback controller operates by first using a conventional codec for decoding and reading transmitted signal frames into a signal buffer as soon as all information necessary to decode those frames have been received. Note that for some codecs, this "necessary information" may include previous packets, as long as they have not yet been declared as "losses." Samples of the decoded audio signal are then played out of the buffer according to the needs of the player device. Note that the size of the input frame read into the buffer and the size of the output frame (i.e., the sample output to the player device) do not need to be the same. Input frame size is determined by the codec, and some codecs use larger frame sizes to save on bitrate. Output frame size is generally determined by the buffering system on the playout or playback device. For example, in a tested embodiment, a 10 ms output frame was used in combination with a 20 ms input frame. However, rather than simply playing back the frames, the adaptive audio playback controller stretches or compresses the signal, as necessary, to perform real-time jitter control and packet loss concealment as a function of buffer content.

Primary components of the de-jittering processes include signal stretching processes, and signal compression processes. These processes operate based on a maximum and minimum buffer size. In a tested embodiment, a 10 ms minimum buffer size was used to guarantee enough data is present in the buffer to allow for good quality stretching. In contrast, the maximum buffer size is designed as a tradeoff between minimizing the probability that any given sample will need to be stretched, and the delay resulting from increased buffer size.

For example, in one embodiment, maximum buffer size was determined by performing a conventional statistical modeling of the broadcast channel or network, and setting the maximum buffer size at a level that will guarantee receipt of at least a minimum threshold number of data packets, such as, for example, 95% of the packets, before those packets are needed for playback. Methods for performing such statistical modeling of packet receipt across a network channel are well known to those skilled in the art, and will not be described in detail herein.

As noted above, one of the components of the adaptive audio playback controller involves a signal stretching process. Conventional signal stretching schemes typically stretch a received frame of the audio signal until the schedule arrival time for the next packet. However, these schemes will declare a packet as a "late loss" when it is not received within a certain predetermined period of time. For example, such schemes typically set a time limit for receiving a packet n that expires soon after the time a prior packet, i.e., packet n−1, was received. If packet n is not received by that predetermined time, a late loss is declared, and "loss concealment" techniques are then used for concealing that loss. Thus, such schemes are packet-based.

In contrast, the adaptive audio playback controller described herein operates as a function of buffer content rather than packet receipt time. For example, unlike conventional stretching schemes, the audio playback controller begins stretching the contents of the buffer whenever a particular packet, e.g., packet n, arrives later than "scheduled." In this case, the signal existing in the buffer is stretched until the delayed packet arrives, or until it is eventually declared "lost."

This process differs from conventional stretching schemes in that rather than immediately declaring a packet as a "late loss" when it is not received within a predetermined period of time, the contents of the buffer, the amount of stretching already performed, and the reception of any subsequent packets are all used to determine an appropriate time for declaring that packet to be a late loss. Consequently, the adaptive audio playback controller provides a significantly increased packet receipt time prior to declaring a late loss for any given packet. As a result, packet "late loss" is significantly reduced, thereby resulting in a significantly reduced use of packet loss concealment processes for reducing artifacts in the signal, and a perceptibly cleaner signal playback.

In particular, rather than setting a time limit for declaring packet loss, the adaptive audio playback controller simply waits for the next packet to be received, or until one of several "loss conditions" are satisfied, as described below. For example, one such loss condition is to set a maximum delay time for packet receipt. Given a sufficiently long delay time T, late loss will only be declared in relatively extreme delay cases, when a signal connection was lost, or when a talk spurt ended in the case where no information is sent about the end of the talk spurt. In a tested embodiment, values for the delay time T on the order of about 20 ms to about 1 sec were used, with values of T around 100 ms typically providing good results.

A second loss condition relates to receiving a subsequent packet prior to receiving the next expected packet in the transmission. Typically, this results from either packet inversion, or actual packet loss. As noted above, conventional schemes typically will generally ignore packet arrival order, and wait the maximum amount of time regardless of whether a subsequent packet has been received or not. Instead, the adaptive audio playback controller reduces the time required to declare a late loss whenever a subsequent packet is received prior to receiving the expected packet. However, to minimize any declarations of "late loss" due to packet inversion, the adaptive audio playback controller waits before declaring a loss, even if a subsequent packet has already been received. Since packet inversions are rare, the waiting is kept to a minimum, in order to avoid introducing additional artifacts in the signal. More specifically, the signal in the buffer will not be stretched beyond the period that the buffered signal would be stretched in the case where a packet loss would be declared, as noted above. Once that time has been reached, the packet n is declared as lost, and the packet loss concealment processes described below are used to reduce or eliminate artifacts in the signal.

Figure 3:
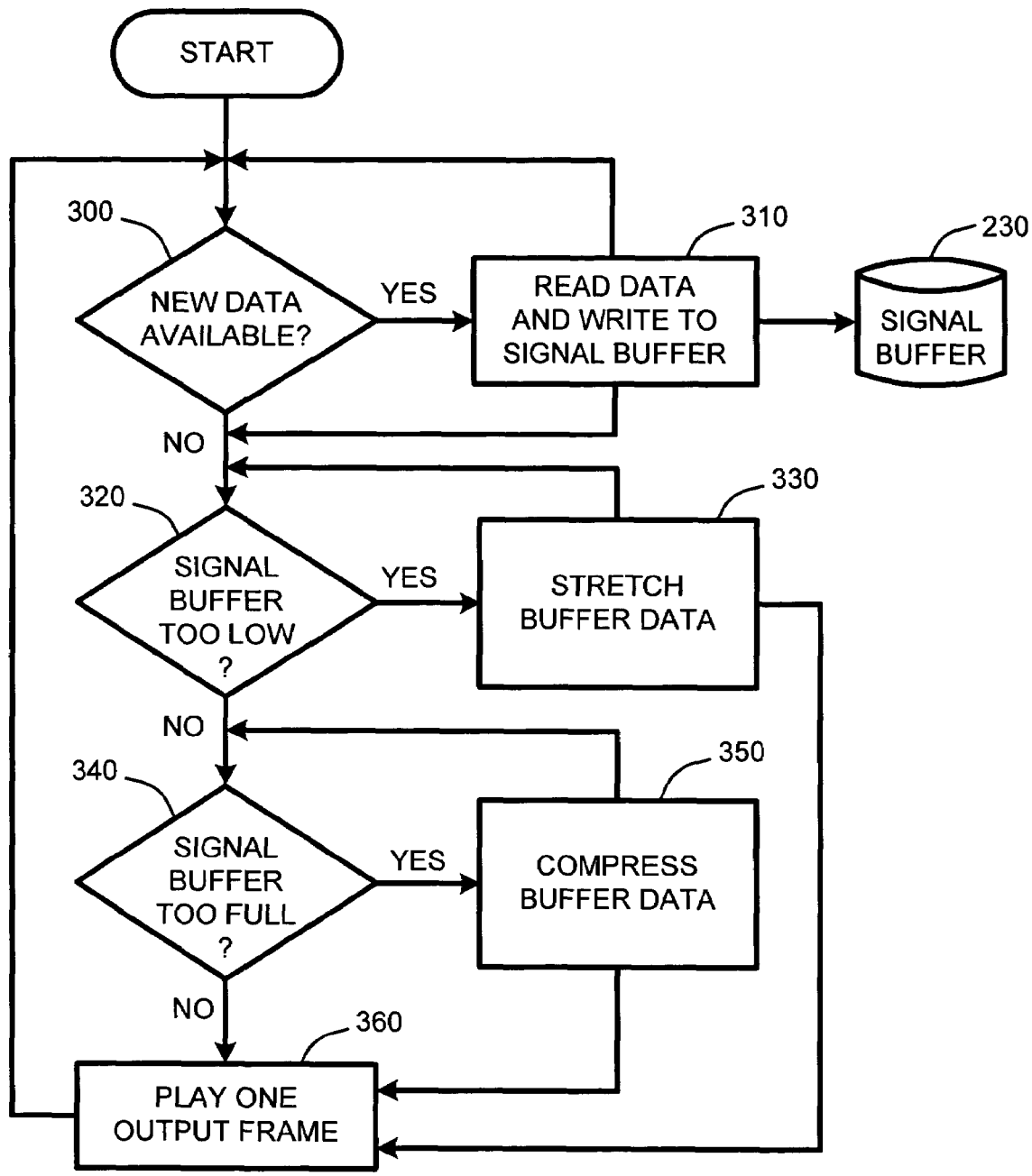
FIG. 3 illustrates an exemplary system flow diagram for adaptive buffer-based jitter control and packet loss concealment for playback of an audio signal.

The processes described below are generally illustrated by FIG. 3. In particular, as illustrated by FIG. 3, when new data 300 is available it is read and subsequently written 310 to the signal buffer 230. Then, an analysis of the buffer content is made to determine whether the buffer is too low 320. If the contents of the signal buffer 230 are determined to be too low, then the contents of the buffer are stretched 330 as described in detail below. In contrast, if the contents of the buffer 230 are determined not to be too low, then a determination is made as to whether the buffer is too full 340. In the case where buffer is too full, then the contents of the buffer are compressed 350 as described in detail below. Finally, a segment of the buffer, unmodified, stretched, or compressed, is then played 360, one output frame at a time via a conventional playback device. These steps continue to loop, along with the ongoing analysis of the signal buffer content for the purpose of determining how to best handle incoming packets in a conventional lossy and delay prone packet-based network.

In another related embodiment, the stretching and compressing is utilized mostly to compensate for clock drift (i.e., small differences in clock frequency) between encoder and decoder clocks. In this embodiment, threshold buffer sizes (i.e., the buffer is too low, or the buffer is too full) for initiating either stretching or compressing of the buffered signal can be relatively small, typically on the order of about one or two pitch periods.

3.2 Packet Loss Concealment:

As noted above, although late loss of packets is reduced by using an increased delay time T, a loss concealment mode is still implemented to hide such losses when necessary. In particular, once it is determined that a packet is lost, the system will no longer wait for that packet to be received. Loss concealment then takes the form of either a "mute mode," or of a "loss concealment mode."

Figure 4:
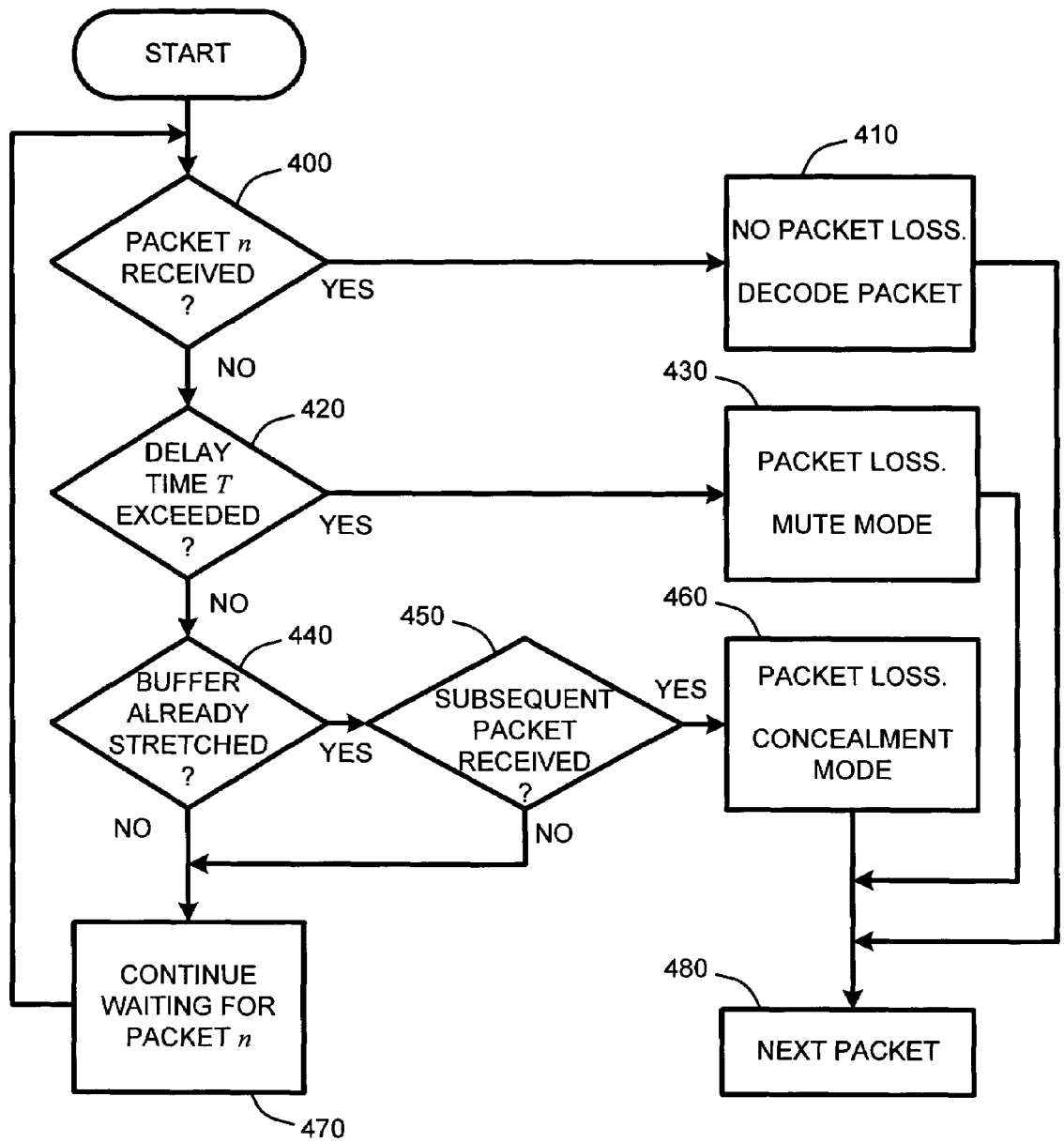
FIG. 4 illustrates an exemplary system flow diagram for determining when to declare packet late loss and implement packet loss concealment processes for playback of an audio signal.

For example, as illustrated by FIG. 4, a lost packet triggers either a "loss concealment mode" 460 or a "mute mode" 430. In particular, if an expected packet, packet n, has been received 400, then there is no packet loss. That packet is then decoded 410 and provided to the signal buffer. However, if the expected current packet, packet n, has not been received 400, then a determination is made as to whether the delay time T has been exceeded 420. If the delay time T has been exceeded 420, then a packet loss is declared and the mute mode is entered 430.

Alternately, if the delay time T has not yet been exceeded 420, then a determination is made as to whether the data in the signal buffer has already been stretched 440. If that data has been stretched 440, then a determination as to whether any subsequent packet, e.g., packet n+1 or higher, has already been received 450. If a subsequent packet has been received 450, then a packet loss is declared and the concealment mode is entered 460. However, if either the buffer data has not been stretched 440, or a subsequent packet has not yet been received 450, then the adaptive audio playback controller simply continues waiting for the expected packet, i.e., packet n 470 while looping through the above steps, 400 through 460. Once the packet is either declared not lost 410, or lost (430 or 460), and the appropriate action taken, then the next packet, i.e., packet n+1, becomes the current packet, and the aforementioned steps (400 through 480) repeat.

3.2.1 Mute Mode and Comfort Noise:

As noted above, the mute mode 430 is entered when no packet is received for a length of time exceeding some predetermined threshold such as the delay time T. In general, when no packet is received within the delay time T, this non-receipt is interpreted as either the end of a talk spurt or a loss of connection. In either case, the receiver will "mute" the current signal. In one embodiment, this muting is implemented gradually so as to minimize audible artifacts in the signal. In another embodiment, the signal is not entirely muted, but is instead reduced to a "comfort noise" level. Comfort noise is frequently used in conventional communications systems for simulating a noise level similar to any noise that was present when the connection was active, but when there was no speech. Consequently, signal loss is not readily apparent to the listener. This is important for maintaining apparent signal quality in lossy networks where the signal may be lost and reestablished a number of times during a typical communication session.

With respect to the mute mode 430, the adaptive audio playback controller presents a unique process for generating comfort noise by using a running comfort noise buffer containing a number of "silence frames." In a tested embodiment, using a comfort noise buffer of about three or so silence frames provided good results. In general, whenever a new frame is received, the overall energy E of the frame is computed and compared to the stored energy of the current silence frames in the comfort noise buffer. If the current frame has lower energy than any of the frames already in the comfort noise buffer, then the frame having the highest energy is replaced with the current frame. Further, in addition to storing the energy of the frame, the magnitude of the FFT coefficients of the frames are also stored for use in synthesizing a "comfort noise frame," as described below.

In a related embodiment, a periodic renewal of the silence frames in the buffer is forced through use of a time-out mechanism so as to avoid an atypically low energy silence frame remaining in the buffer forever. For example, if a particular frame is in the buffer for over a predetermined time limit, such as, for example, 15 seconds, the nominal energy $E_i$ of the frame is increased (but not the magnitude of the stored FFT coefficients). This will increase the likelihood that the frame will eventually be replaced with a new frame having lower energy. Assuming a 15 second time limit here, the $E_i$ is doubled every 15 seconds, and a small amount of an arbitrary frame, such as the current frame, for example, is added to handle any cases where $E_i=0$.

When a comfort noise frame is needed, the buffered silence frames are then used to generate one. In particular, the average magnitude of the stored silence frames is computed, and a random phase shift is added to the FFT prior to computing the inverse FFT. This signal is then overlapped/added to the signal in the buffer using a conventional window, such as, for example, a sine window. In particular, comfort noise is created in any desired length by computing the Fourier transform of the average magnitude of the silence frames, introducing a random rotation of the phase into the FFT coefficients, and then simply computing the inverse FFT for each segment to create the comfort noise frame. This produces a signal frame having the same spectrum, but no correlation with the original frames, thereby avoiding perceptible artifacts in the signal. In addition, longer signals can be obtained by zero-padding the signal before computing the FFT. These synthesized comfort noise frames are then inserted into the signal playback by using a windowing function to smooth the transition points between the original and subsequent signal frames.

3.2.2 Loss Concealment Mode:

As noted above, the loss concealment mode 460 is entered whenever a subsequent frame is received, one or more intermediate frames are missing, and the data in the signal buffer has already been stretched. Further, loss concealment is either "generic" or specific to whatever codec is being used to decode the incoming packets. For example, many codecs already provide loss concealment algorithms specified as part of the codec. In such a case, the packet loss concealment may use the existing processes of the codec. In other cases, the prescribed loss concealment for a particular codec may not exist or may be sub-optimal. This is often the case, since most loss concealment algorithms have been designed for constant-frame size environments, and have the constraint of preserving a fixed output frame length. However, when using the techniques described herein the output frame size is not constrained by the input frame size; therefore, this particular constraint is irrelevant with respect to the adaptive audio playback controller. Further, in either case, the determination of when such loss concealment is to be applied, even with the existing codecs, differs from conventional loss concealment methods by use of the aforementioned signal buffer analysis for deciding whether frames are to be stretched or compressed.

Figure 5:
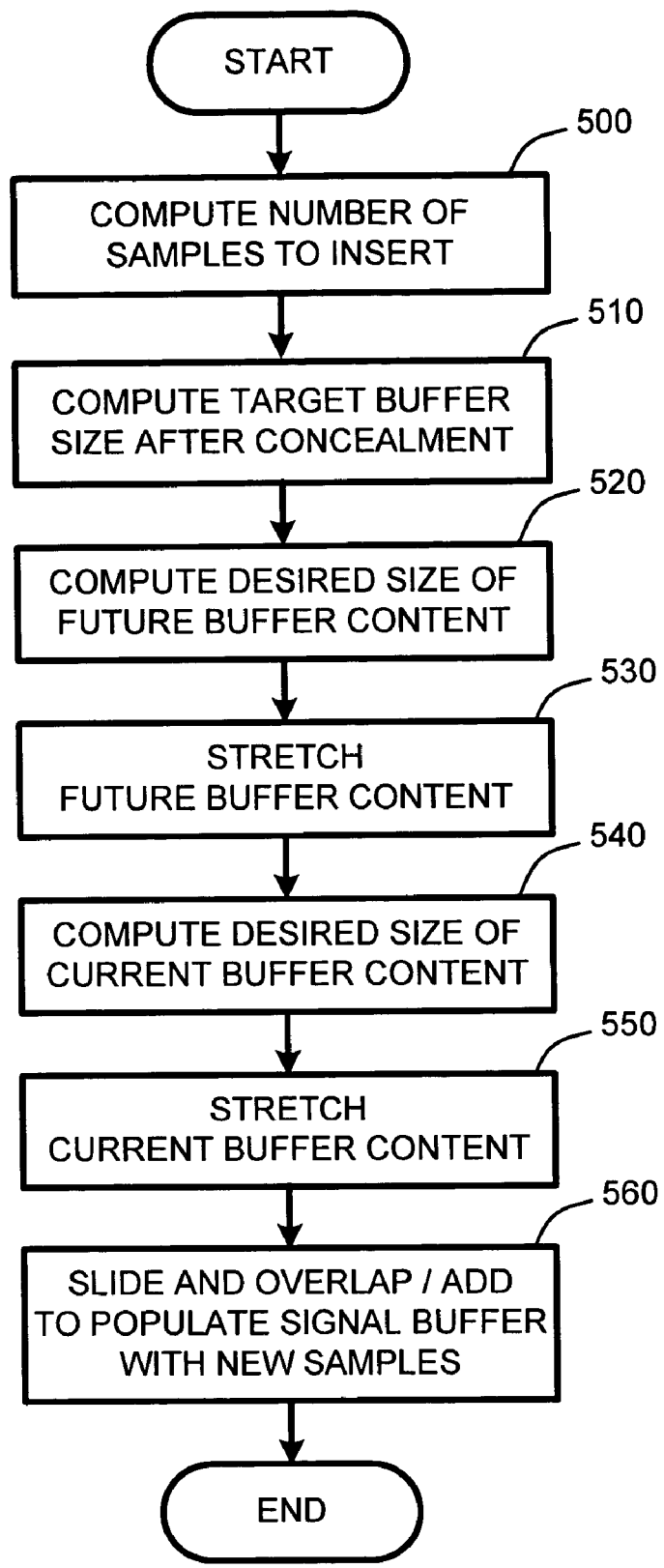
FIG. 5 illustrates an exemplary system flow diagram for implementing packet loss concealment processes for playback of an audio signal following a determination of packet late loss.

For example, a loss concealment mode designed for G.711 (PCM) coded speech, but which is also appropriate for use with many other conventional codecs, is illustrated by FIG. 5. Note that this loss concealment mode provides an improvement over the standard G.711 loss concealment algorithm, published as appendix 1 to the ITU-T recommendation G.711. As described above with respect to FIG. 4, the concealment mode 460 will only be entered when at least one subsequent frame has been received. For that reason, in addition to any signal frames still remaining in the signal buffer, i.e., "current buffer content", the frame buffer also contains some non-contiguous future segment of the input signal, i.e., "future buffer content." The lost segment corresponds to any missing or non-received samples existing between the current buffer content and the future buffer content.

As illustrated in FIG. 5, the first step in loss concealment is to determine the number of signal samples 500 that need to be inserted between the current buffer content and the future buffer content. In the simplest case, the number of samples is simply set equal to the number of samples corresponding to the lost frame or frames represented by the lost packet. However, in another embodiment, a slightly more elaborate computation is used to determine the number of samples needed. In particular, as described above, some stretching of the signal buffer content will have already occurred prior to packet loss concealment.

Consequently, a better estimate of the number of samples needed is determined by first subtracting the number of samples resulting from that stretching from the number of lost samples. Further, to allow enough data for windowing (i.e., overlapping/adding) the transition between the inserted samples and the current and future buffer content, samples representing at least an additional half-window are added to the total number of samples to be inserted. Further, in one embodiment, additional samples are inserted to allow the alignment between the two segments to be done in both directions.

Note that if too many frames are lost, any transition will likely sound unnatural. Consequently, in a related embodiment, to address this case, and to further reduce any resulting artifacts, the number of frames to be replaced is limited to two frames. However, it should be noted that, if necessary to keep overall signal length, the signal may later be further stretched at some other point in the data existing in the signal buffer.

The next step is to compute a desired or target size for the future buffer content 510. The simplest method is to set the target size of the future buffer content equal to current size of the future buffer content, plus the number of samples to be inserted plus the overlap/add window size divided by 2. In other words, as illustrated by Equation 1:

$$DF=LF+(K+OV)/2 \qquad \text{Equation 1}$$

where DF is the target size for the future buffer content, LF is the actual current size of the future buffer content, K is the number of target samples to insert, and OV is the overlap/add window size (i.e., size of the sine window or other window used for the overlap/add operation).

Another method for computing the desired size for the future buffer content is described below in Section 3.2.2.1 with respect to FIG. 6. However, in any case, once the target size of the future buffer content is computed, the future buffer is stretched from its current size to approximately the target size. Any conventional stretching method may be used to complete the stretching operation. A novel stretching method is described in a copending United States utility patent application entitled "A SYSTEM AND METHOD FOR PROVIDING HIGH-QUALITY STRETCHING AND COMPRESSION OF A DIGITAL AUDIO SIGNAL," filed Sep. 10, 2003, and assigned Ser. No. 10/660,325, the subject matter of which is hereby incorporated herein by this reference.

In general, as described in the aforementioned copending patent application entitled "A SYSTEM AND METHOD FOR PROVIDING HIGH-QUALITY STRETCHING AND COMPRESSION OF A DIGITAL AUDIO SIGNAL," this novel stretching method provides an adaptive "temporal audio scalar" for automatically stretching and compressing frames of audio signals received across a packet-based network. Prior to stretching or compressing segments of a current frame, the temporal audio scalar first computes a pitch period for each frame for sizing signal templates used for matching operations in stretching and compressing segments.

Further, the temporal audio scalar also determines the type or types of segments comprising each frame. These segment types include "voiced" segments, "unvoiced" segments, and "mixed" segments which include both periodic and aperiodic components. The stretching or compression methods applied to segments of each frame are then dependent upon the type of segments comprising each frame. Further, the amount of stretching and compression applied to particular segments is automatically variable for minimizing signal artifacts while still ensuring that an overall target stretching or compression ratio is maintained for each frame.

Since the stretching process may produce slightly more (or less) than the desired samples, depending upon the content of the frame being stretched, the necessary length of the current buffer content is estimated as the desired total length, plus the required overlap (for the overlap/add process), minus the actual size of the future buffer content after stretching. In other words, as illustrated by Equation 2:

$$DC=T+OV-AF \qquad \text{Equation 2}$$

where DC is the desired or target size for current buffer content, T is the target total size of the signal buffer after concealment, OV is the overlap/add window size, as noted above, and AF is actual size of future buffer content after stretching. Given the target size of the current buffer content, the current buffer is then stretched by the necessary amount to achieve that target size. Finally, a variable content-based overlap/add windowing process is applied to mix or fade the current and future buffer content into a continuous segment of the input signal. Note that this overlap/add process is described generally below with respect to FIG. 7, and in more specific detail in the aforementioned copending United States utility patent application entitled "A SYSTEM AND METHOD FOR PROVIDING HIGH-QUALITY STRETCHING AND COMPRESSION OF A DIGITAL AUDIO SIGNAL."

3.2.2.1 Computing the Target Size for Buffer Content:

As noted above, a simple solution for determining the target size for stretching the future and current buffer content is given by Equation 1 and Equation 2, respectively. However, an alternate solution is illustrated by FIG. 6. In general, as illustrated by FIG. 6, the generic approach of Equation 1 and Equation 2 is modified to decide how much to stretch the future and current buffer content so as to minimize perceivable artifacts in the stretched signal.

Figure 6:
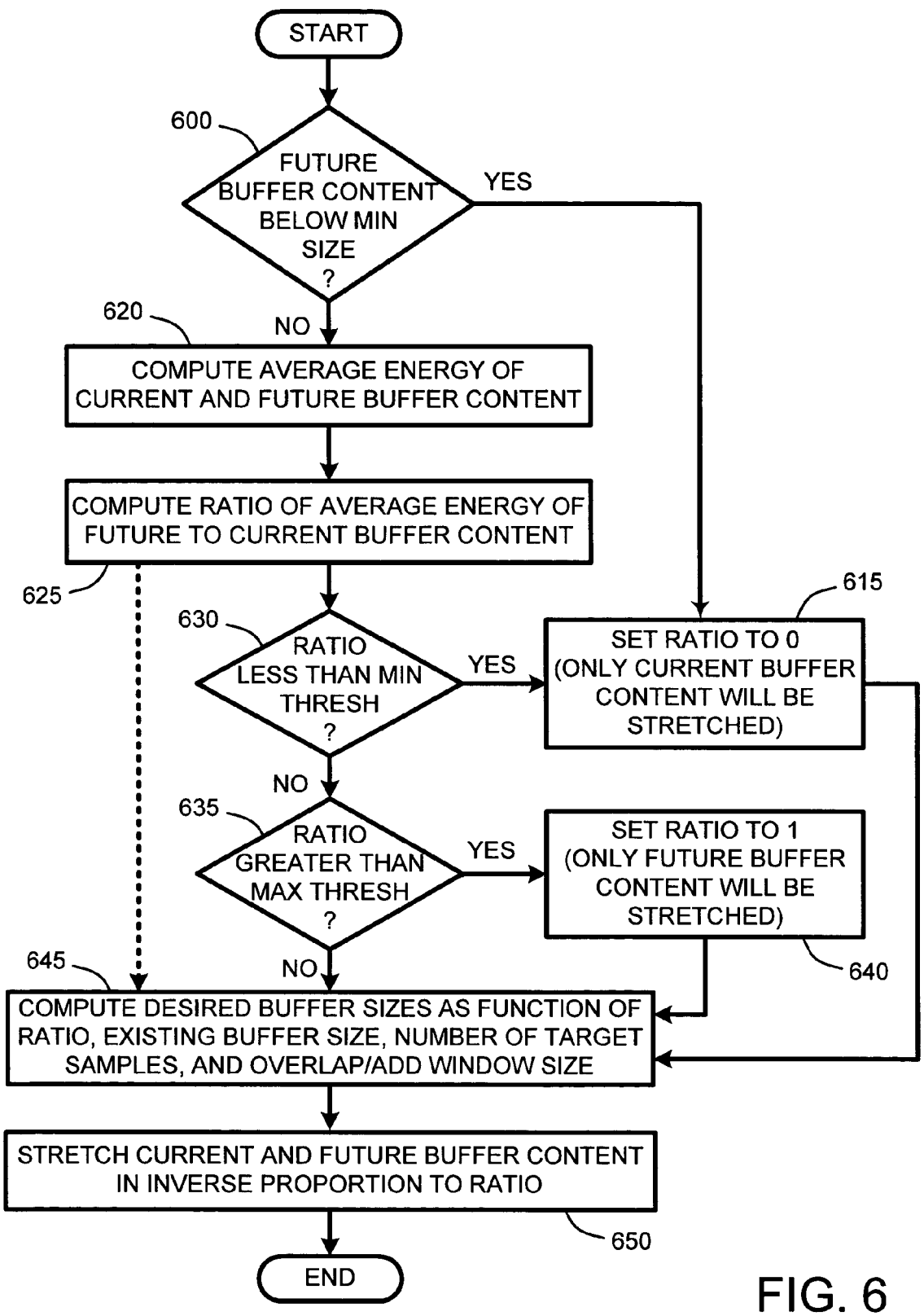
FIG. 6 illustrates an exemplary system flow diagram for determining how much particular segments of a signal buffer should be stretched to compensate for packet delay for playback of an audio signal.

As illustrated by FIG. 6, the first step is to determine whether the buffer content is sufficiently long to allow for stretching without noticeable artifacts. In particular, the future buffer content is first examined to determine whether it is below a minimum size 600 to allow for high quality stretching. For example, in one embodiment, a minimum size of about two "pitch" periods may be used as an indicator of whether the content can be stretched without creating undesirable artifacts. In another tested embodiment, a minimum size of 280 samples was used.

When the future buffer content is below the minimum size 600, then a ratio of the average energy of the future buffer content to the average energy of the current buffer content is set to zero 615, thus resulting in stretching of only the current buffer content (see discussion of Box 645 below). Note that the current buffer does not need to be tested for minimum size, first because it is always kept larger then the minimum size, and second, because in any case one of the two (current or future buffer content) have to be stretched to cover for the missing (lost) segment.

The reason for limiting stretching of signals less than two pitch periods is that stretching a voiced segment without having at least two pitch periods will generally introduce undesirable artifacts into the signal. As is well known to those skilled in the art, voiced sounds such as speech are often modeled using quasi-periodic pulses that are typically referred to as the fundamental frequency or "pitch." However, as the concepts of pitch and pitch period are well known to those skilled the art, the determination of pitch and pitch period will not be described herein.

In stretching the content of the signal buffer, stretching is preferably divided between the current and future frames as a function of the energy of each frame so as to minimize signal artifacts resulting from the stretching. In general, the amount of stretching of the future and current buffer content is done in inverse proportion to the energy of that content. The reason for this approach is that, in general, stretching a low energy signal close to a high energy signal tends to mask audible artifacts. Thus, for example, if the future buffer content includes 80 percent of the total energy, and the current buffer content includes 20 percent of the energy, then the future buffer content will be stretched by 20 percent and the current buffer content will be stretched by 80 percent of the extra samples needed.

When the future buffer content is not below the minimum size 600, the energy of both the current buffer content and the future buffer content is computed 620. These average energies are then used to compute a ratio of the average energy 625. In one embodiment, these ratios are then used to compute the desired size of the future and current buffer content 645 as a function of the ratio, existing buffer size, number of target samples needed, and the overlap/add window size. For example, the target size for the future buffer content may be computed as illustrated by Equation 3:

$$DF = LF + (K + OV) \cdot R, \begin{cases} R = 1/\text{RATIO if RATIO} \neq 0; \\ R = 0 \quad \text{otherwise} \end{cases} \quad \text{Equation 3}$$

where DF is the desired or target size for future buffer content, LF is the existing size of the future buffer content, K is the total number of target samples to insert, and OV is the overlap/add window size.

Similarly, the target size for the current buffer content could be computed using an equation similar to Equation 3. Nevertheless, a more appropriate solution is to use equation 2, which will give the same results if the actual stretching of the future plane happens exactly as requested, but will also incorporate any small differences between the target and actual size of the future buffer after stretching.

However, rather than blindly applying Equations 2 and 3 to determine the target size for the future and current buffer content, better results are achieved by first examining the computed ratio 625 to determine whether the future or current buffer content should actually be stretched.

In particular, in one embodiment, if the computed ratio 625 is less than a predetermined minimum threshold 630, then the ratio is set to zero 615 so that the future buffer content will not be stretched at all because the relative energy of the future buffer content is so large compared to the current buffer content that stretching of the future buffer content would likely result in noticeable artifacts. Similarly, if the computed ratio 625 is greater than the predetermined minimum threshold 630, then a determination is made as to whether the computed ratio exceeds a predetermined maximum threshold 635.

If the predetermined maximum threshold 635 is exceeded, then the ratio is set to one 640 so that the current buffer content will not be stretched at all because the relative energy of the current buffer content is so large compared to the future buffer content that stretching of the current buffer content would likely result in noticeable artifacts. In one embodiment, stretching is distributed between the current and future buffer content before taking into account the stretching already performed in the current buffer content (as a result of waiting for a particular frame, as described above), at which point the minimum and maximum thresholds are applied as described above.

Next, whether the ratio is computed 625, or set to zero 615 or one 640 as a function of the minimum and maximum ratio thresholds, the desired or target buffer sizes are then computed as described above with respect to Equations 2 and 3. Finally, the future and current buffers contents are stretched 650 (or not stretched if appropriate) by inserting the appropriate number of samples into each buffer to meet the target size.

3.2.2.2 Overlap/Add of Stretched Buffer Frames:

As noted above, once samples from one or both buffers have been stretched enough to cover the lost segment of the signal, it is necessary to window the samples for easing the transition points between the original content of the current buffer and the contents of the future buffer. The aforementioned overlap/add process is used for this purpose. This overlap/add process differs from conventional overlap/add procedures in that it is dependent upon the content type of the signal in the buffers.

For example, in an audio signal including speech, each segment of any particular frame will be either a "voiced", an "unvoiced", or a "mixed" segment, as described above. Then, in order to achieve optimal results, an overlap/add process that is specifically targeted to the particular mix of segment types is applied.

In general, in contrast to conventional windowing schemes, different windows are used for each frame type mix (e.g., voiced/voiced, voiced/unvoiced, etc). Also, the alignment strategy is different for different frame type mixes. For example, only in the case where neither frame type is unvoiced, the frames are aligned. This alignment will match the pitch period of the current buffer with that of the future buffer before the overlap/add is performed. In particular, a "template" is first selected from the current buffer content of same length as the overlap window. The future buffer content is then examined to identify a match in the future buffer content. One method for identifying such matches is to simply compute the cross correlation of the template with the beginning of the future buffer content. The largest peak in the cross correlation then represents the best match. The future buffer content is then shifted by the offset, discarding any samples between the start of the future buffer content and the best match. Then, because the two signal segments are correlated via the alignment, a sum-one overlap/add window is used to smooth the transitions between the current and future buffer content. An example of such sum-one window is a Hann window.

In the case where at least one of the frame types is unvoiced, there is theoretically no correlation between samples. Consequently, there is no need to perform the alignment as with the voiced samples. Therefore, a square-sum-one window is used by the overlap/add process for smoothing the transition points. An example of such a square-sum-one window is a sine window.

Note that specific details of this frame-type dependent overlap/add process are provided in Section 3.2 of the aforementioned copending patent application entitled "A SYSTEM AND METHOD FOR PROVIDING HIGH-QUALITY STRETCHING AND COMPRESSION OF A DIGITAL AUDIO SIGNAL."

3.3 Codec-Specific Loss Concealment Modes:

The loss concealment procedures described above ignore any distortions or artifacts produced by interdependencies between frames. This is not a problem with signals which have been coded using codecs such as G.711 (PCM). However, when speech has been encoded by some other codec, the loss of a frame will typically induce some mismatch between the internal state of the decoder when compared to the state assumed by the encoder. Consequently, more noticeable artifacts may result from the stretching described above, which may stretch and thus reinforce segments which were not perfectly decoded. The procedures described above are still applicable to such cases, but will most likely yield sub-optimum results.

However, the methods for stretching signals to conceal lost frames described above may be modified to address particular codecs to address frame interdependencies resulting from the particular codec used to encode the audio signal. In particular, one may take note of the expected quality of certain segments following a loss, and take that into account when deciding whether or not to stretch that particular segment. For example, the conventional "Siren Codec" (ITU-T G.722.1 codec), currently used in Windows Messenger™ is based on the well known Modulated Lapped Transform (MLT). The only state information is 320 partial samples that overlap between adjacent frames. In this case, this known partial information is used to produce results which are audibly superior to those produced by the standard Siren Codec error concealment.

3.3.1 Basic Modification to the Stretching Process:

The simplest approach to modify the stretching techniques described above in Section 3.2 is to ignore any incomplete segments of a Siren-coded signal. In particular, Siren frames are 20 ms (320 samples) each, but each Siren frame contains coefficients corresponding to a 640 point MLT. Subsequent frames are then overlapped by 320 samples and added. Therefore, if a single frame is missing, a total of 40 ms of speech will be incomplete. In one embodiment, the entire 40 ms is declared as lost, and the concealment processes described above are applied to conceal that loss. However, this basic approach throws away useful information contained in the partial segments surrounding the lost frame.

3.3.2 Using Interdependency Information in the Stretching Process:

In another embodiment, rather than ignoring the partial information in the surrounding frames, that information is used to create samples for extending the contents of the buffer. In this embodiment, the way the MLT is constructed is used advantageously to partially reconstruct as many "lost" samples as possible. For example, because of the way in which the MLT is computed, the leading and trailing half of each surrounding segment is increasingly dominated by the signal that is to be estimated for loss concealment, with the samples increasing in accuracy towards the ends closest to the missing frame. Specifically, as is known to those skilled in the art of MLT computations with respect to the G.722.1 codec:

"The MLT can be decomposed into a window overlap and add operation, followed by a type IV Discrete Cosine Transform (DCT). The window, overlap and add operation is given by:

$v(n)=w(159-n)x(159-n)+w(160+n)x(160+n)$, for $0 \leq n \geq 159$ $v(n+160)=w(319-n)x(320+n)-w(n)x(639-n)$, for $0 \leq n \geq 159$ where:

$w(n)=\sin((pi/640)(n+0.5))$, for $0 \leq n \geq 320$"

Consequently, if at the decoder side, the inverse DCT is performed, but the overlap/add operation is not, the signal v[0:319] as defined above will be recovered. Further, note that v[0:159] is increasingly dominated by x[160:319]. For example, v[159]=0.0025x[0]+0.999997x[319]. Consequently, it should be clear that v[159] can be used as an approximation for x[319]. Obviously, the further from the center of v, the worse the approximation is. In addition, it should also be noted that since time reversing a signal does not affect its spectrum, the spectrum of the reversed part of x should be similar to that of the original x.

Further, adding two uncorrelated signals is equivalent to adding their spectrum. But, as the extremities of v are approached from either side, the two samples of x are increasingly close to each other, and therefore more correlated. For this reason, rather than use all of the samples in v, the last few samples are eliminated, and the remaining samples were used to estimate at least some of the missing samples before replacing any remaining lost samples using the stretching methods described above. The last 5 to 30 samples on each side of v may be discarded.

For example, assuming that the last 20 samples on each side of v are discarded, then only the center 280 samples are used. Therefore, if a single frame is lost, instead of discarding the whole 640 incomplete samples as described in section 3.3.1, the partial information is used as a way of estimating some of these samples. In a tested embodiment, 280 samples were used to estimate the corresponding 140 samples closest to each extremity of the missing samples, so that only the loss of the center 360 samples actually needs to be concealed using the stretching processes described above. Further, because the estimated samples are not as good as true samples, in one embodiment, they are not used to stretch the signal. Consequently, signal stretching is preferably restricted to samples which were completely decoded, rather then those samples that were estimated as described above.

3.4. Selective Signal Compression:

Due to the need to keep up with the real-time nature of the communication, the stretching processes described above are done immediately, whenever a frame is not received in time. Consequently, there is very little choice in whether a particular segment must be stretched (although there is some choice as to where a particular segment is to be stretched, as described in the aforementioned copending patent application entitled "A SYSTEM AND METHOD FOR PROVIDING HIGH-QUALITY STRETCHING AND COMPRESSION OF A DIGITAL AUDIO SIGNAL." However, there is significantly greater flexibility in compressing the signal for reducing signal delay when the signal buffer becomes too full.

For example, when compressing the signal, it is typically a good idea to wait for a segment of speech where compression is expected to produce little or no artifacts, rather than simply compress the next segment to be played out. One simple solution is to compress only in between talk spurts. However, a better process considers how much compression is desired (i.e., how far behind in time signal playback is), and how easy it is to compress a particular segment while minimizing artifacts. Further, it is noted that the need to compress implies that a long segment of the signal is in the buffer, and therefore there is some freedom on where to compress that signal.

The selection of which segments to actually compress in any given frame or frames is an important decision, as it typically affects the perceived quality of the reconstructed signal for a human listener. For example, rather than compress all segments of the signal buffer equally, better results are typically achieved by employing a hierarchical or layered approach to compression. In particular, as noted above, the type of each segment is often already known by the time that compression is to be applied to a frame. Given this information, the desired compression is achieved in any given frame or frames by first compressing particular segment types in a preferential hierarchical order.

In particular, segments that represent voiced segments or silence segments (i.e., segments that include relatively low energy aperiodic signals) are compressed first. Next, unvoiced segments are compressed. Finally, mixed segments, or segments including transients are compressed. The reason for this preferential order is that compression of voiced or silence segments is easiest to accomplish without the creation of noticeable artifacts. Compression of unvoiced segments is the next easiest type to compress without noticeable artifacts. Finally, mixed segments and segments containing transients are compressed last, as such segments are the hardest to compress without noticeable artifacts.

Consequently, rather than compressing all segments equally in any particular frame or frames, better results are typically achieved by selectively compressing particular segments in those frames, or particular frames. For example, compressing segments that represent voiced speech, silence or simple noise, while avoiding compression of unvoiced segments or transients, produces a reconstructed signal having reduced perceivable artifacts. If sufficient compression cannot be accomplished by compressing voiced or silence segments, then non-transitional unvoiced segments are compressed in the manner described above.

Finally, segments including transitions are compressed if sufficient compression can not be achieved through compression of the voiced segments or non-transitional unvoiced segments. This hierarchical approach to compression serves to limit perceivable artifacts in the reconstructed signal. Further, if sufficient unplayed frames are available, then the desired compression can be spread out over several frames, as necessary, by compressing only those segments that will result in the least amount of signal distortion or artifacts.

In general, once the particular segments to be compressed have been selected or identified, compression of segments is handled in a manner similar to that described above for stretching of segments. For example, when compressing a voiced segment, a template is selected from within the segment, and a search for a match is performed. Once the match is identified, the segments are windowed, overlapped and added, thus cutting out the signal between the template and the match. As a result, the segment is shortened, or compressed. On the other hand, when compressing an unvoiced segment, either a random or predetermined shift is used to delete a portion of the segment or frame, along with a windowing function such as a constant square-sum window to compress the segment to the desired amount. Finally, mixed segments are compressed using a weighted combination of the voiced and unvoiced methods as described in the aforementioned copending patent application entitled "A SYSTEM AND METHOD FOR PROVIDING HIGH-QUALITY STRETCHING AND COMPRESSION OF A DIGITAL AUDIO SIGNAL."

3.5. Processing in the LPC Residual Domain:

In the preceding discussion, the adaptive audio playback controller accomplished adaptive compression and stretching of signal segments for providing jitter control and packet loss concealment by acting on the signal in the time domain. However, a signal can always be decomposed into a spectral envelop, or (Linear Predictive Coding) LPC spectrum that represents a frame-level spectrum, and an LPC residue that represents short time information such as small details in the signal spectrum. Consequently, in one embodiment, the processes described above with respect to stretching, compression, loss concealment and muting, are implemented in the LPC residual domain.

In general, processing in the LPC residual domain has two main advantages over operating in the original signal domain. First, operating in the LPC residual domain produces fewer artifacts because a match is guaranteed in the spectral domain, and the spectrum will evolve much more smoothly. Second, operating in the LPC reduces delay and may reduce computational overhead because much shorter windows may be used. In fact, because of the close match, the use of the overlap window can simply be ignored altogether, thereby reducing any algorithmic delay to the time required to process a very few number of samples (e.g., 16 samples used in the LPC filter). However, even if a window is used here, a window with just a few samples will provide good results with reduced signal artifacts.

In this embodiment, an LPC filter is estimated from the contents of the signal buffer at a regular interval, such as, for example about 5 ms. The received signal is then passed through the estimated LPC filter in order to obtain an LPC residual. Then, the processes described above are performed on the LPC residual signal rather than on the original time domain signal. Tags for the location of each original point for the LPC filters are kept, then, before playing out, the signal is simply inverse filtered through an interpolated LPC filter. This LPC filter is obtained by interpolating the original LPC filter between corresponding points, as illustrated by FIG. 7.

Figure 7:
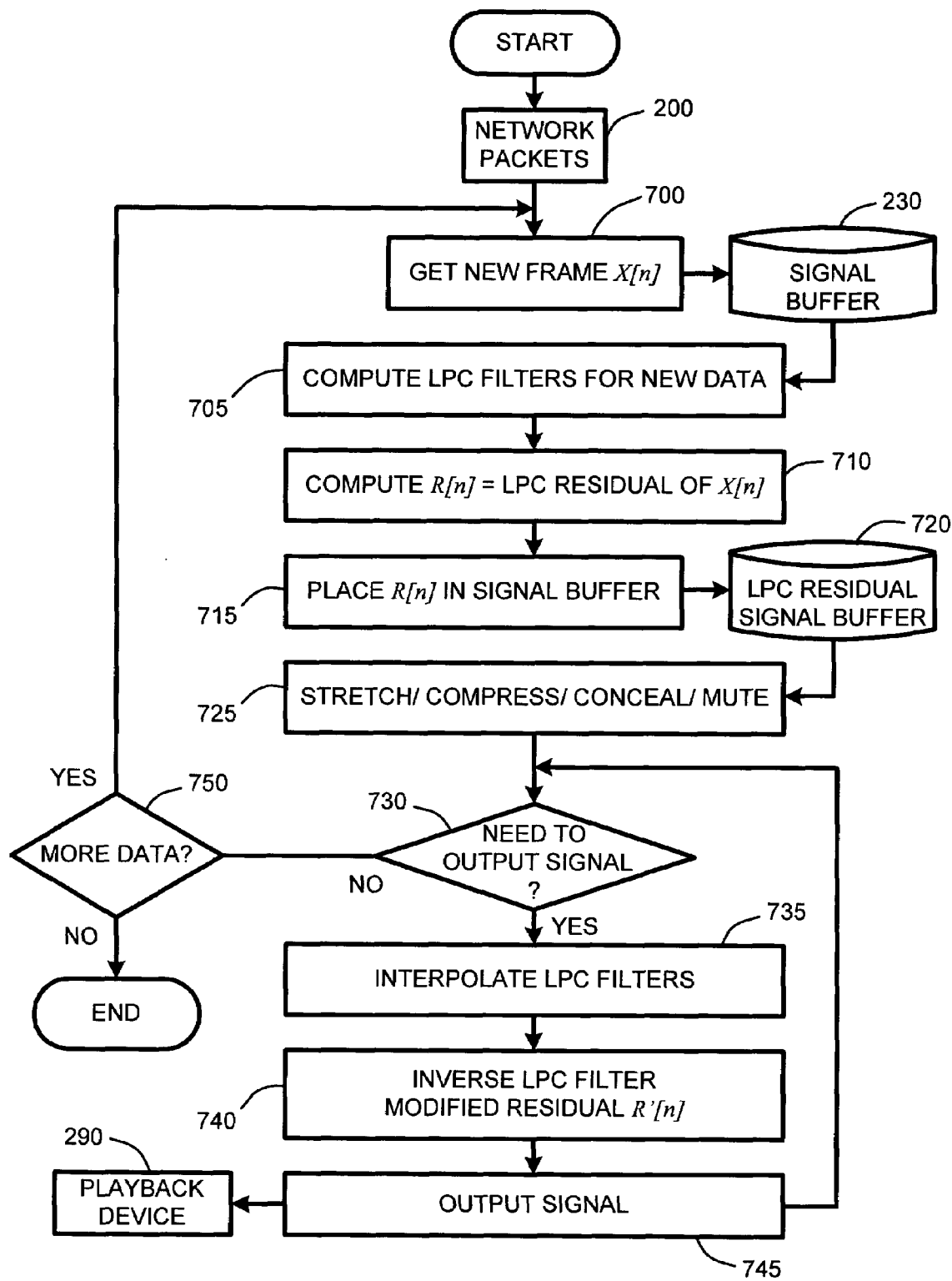
FIG. 7 illustrates an exemplary system flow diagram for adaptive buffer-based jitter control and packet loss concealment in a Linear Predictive Coding (LPC) residual domain rather than a signal domain for playback of an audio signal.

As illustrated by FIG. 7, the first step in using the LPC residual rather than the time domain of the signal is to get a new frame of data 700 by decoding received network packets 200 transmitted across a conventional packet-based network such as the Internet or other packet-based communications network. Once decoded, the frame is immediately sent to the signal buffer 230. At this point, rather than performing an analysis of the signal buffer as in the time-domain case, an LPC filter is computed or estimated 705 for the received frame using conventional LPC computation techniques. In another embodiment, a single LPC filter is used for each frame. However, in a related embodiment, a new filter is estimated and used over relatively short periods, such as, for example, about every 5 ms.

Next, the LPC residual is computed 710 using the estimated LPC filter. However, in another embodiment, better results may be achieved by interpolating between the estimated filters and then using a series of estimated and interpolated LPC filters for computing the LPC residual from the received frame. The computed LPC residual is provided to an LPC residual signal buffer 720, which is basically the LPC residual version of the signal buffer 230. In fact, the LPC residual signal buffer 720 is then treated in the same manner as the signal buffer 230 for the purpose of determining whether to stretch, compress, conceal losses, or mute the signal 725 as described above. In fact, stretching, compressing, and loss concealment 725 are accomplished exactly as described above with respect to the time domain signal, except that in the LPC residual domain, there is no need for a long overlap window. In particular, rather than use a long window for overlap/add operations, a sharp transition, or a simple 3 point window provides satisfactory results.

As with the time domain case, a determination is then made as to whether a signal frame is needed for playback 730 by the output device 290. Then, using pointers to the current location of the original LPC filters, interpolated LPC filters are generated 735. These interpolated LPC filters are then used for performing an inverse LPC filter 740 of the potentially modified (stretched, compressed, loss concealment, mute) LPC residual. Note that the modified (stretched, compressed, loss concealment) LPC residual is the inverse LPC filtered input frame. Therefore, if no processing (stretching, compression, or loss concealment) has been done, then the original input frame will be produced here. The resulting synthesized or original signal frame is then output 745 and sent to the playback device 290.

The steps described above continue looping, 730-745, and 730-700 until the end of the input signal has been reached and there is no more data to provide to the playback device 290.

The foregoing description of the adaptive audio playback controller for performing automatic buffer-based adaptive jitter control and packet loss concealment for audio signals transmitted across a packet-based network as a function of buffer content has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the temporal audio scalar described herein. It is intended that the scope of the invention be limited not by this detailed description, but rather by the claims appended hereto.

What is claimed is:

1. A system for providing adaptive playback of an audio signal received across a packet based network, comprising:
    storing data packets comprising a received audio data signal to a signal buffer;
    outputting parts of the signal present in the signal buffer as needed for signal playback;
    analyzing the data packets contained in the signal buffer to determine whether any data packets are missing, having not been received into the signal buffer by a predetermined packet late loss time;
    specifying a maximum delay period, extending past the predetermined packet late loss time, for receiving any missing data packets;
    following the predetermined packet late loss time, stretching at least part of the signal preceding the missing data packets present in the signal buffer, until any of receiving the missing data packets and exceeding the maximum delay period, when the analysis of the contents of the signal buffer indicates that the length of the signal in the signal buffer is less than a predetermined threshold; and
    compressing at least part of the signal present in the signal buffer when the analysis of the contents of the signal buffer indicates that the length of the signal in the signal buffer is greater than a predetermined threshold.

2. The system of claim 1 wherein analyzing the contents of the signal buffer includes determining a type of the contents of the signal buffer from among a group including: periodic content, quasi-periodic content, aperiodic content and mixed content.

3. The system of claim 2 wherein stretching at least part of the signal having any of periodic content and quasi-periodic content type comprises:
    identifying at least one of the segment of the content of the signal buffer as a template;
    searching for a matching segment in portions of the content of the signal buffer whose cross correlation peak exceeds a predetermined threshold; and
    inserting the template into the content of the signal buffer, and aligning and merging the matching segments.

4. The system of claim 2 wherein stretching at least part of the signal having aperiodic content the type comprises automatically generating and inserting at least one synthetic segment into the buffered signal to increase the length of the content of the signal buffer.

5. The system of claim 4 wherein automatically generating the at least one synthetic segment comprises:
    automatically computing the FFT of the at least part of the signal;
    introducing a random rotation of the phase into the FFT coefficients; and
    computing the inverse FFT for each segment, thereby creating the at least one synthetic segment.

6. The system of claim 4 wherein automatically generating the at least one synthetic segment comprises:
    applying at least one LPC filter to the at least part of the signal to compute an LPC residual;
    computing at least one FFT from the LPC residual;
    introducing a random rotation of the phase into the coefficients of at least one of the computed FFTs;
    computing inverse FFTs from the FFT coefficients to reconstruct the LPC residual; and
    applying at least one inverse LPC filter to the LPC residual, thereby creating the at least one synthetic segment.

7. The system of claim 1 wherein the predetermined threshold for stretching and compressing at least part of the signal present in the signal buffer are optimized to compensate for clock drift between an encoder and a decoder.

8. A system for providing an adaptive playback of received frames of an audio signal transmitted across a packet-based network, comprising:
    receiving and decoding data frames of an audio signal transmitted across a packet-based network;
    storing the decoded data frames to a signal buffer;
    analyzing the contents of the signal buffer to determine whether any data frames are missing due to corresponding data packets having not been received by a predetermined packet late loss time;
    specifying a maximum delay period, extending past the predetermined packet late loss time, for receiving any missing data packets;
    outputting one or more of the decoded frames present in the signal buffer when the analysis of the contents of the signal buffer indicates that the length of the signal in the signal buffer is between a predetermined minimum and a predetermined maximum buffer size;

following the predetermined packet late loss time, stretching and outputting one or more decoded frames preceding the missing data packets in the signal buffer, until any of receiving the missing data packets and exceeding the maximum delay period, when the analysis of the contents of the signal buffer indicates that the length of the decoded frames in the signal buffer is less than the predetermined minimum buffer size; and compressing and outputting one or more decoded frames in the signal buffer when the analysis of the contents of the signal buffer indicates that the length of the decoded frames in the signal buffer is greater than the predetermined maximum buffer size.

9. The system of claim 8 wherein any frame output from the signal buffer is removed from the signal buffer as it is output.

10. The system of claim 8 further comprising packet loss concealment for signal packets declared to be late loss packets.

11. The system of claim 8 wherein stretching and outputting one or more decoded frames provides automatic jitter control as a function of buffer content.

12. The system of claim 11 wherein stretching one or more decoded frames further comprises automatically determining a content type of the stretched frames prior to stretching those frames.

13. The system of claim 12 wherein the content type includes any of voiced framed, unvoiced frames, and mixed frames.

14. The system of claim 13 wherein stretching any voiced frame comprises:
identifying at least one of the segment of the voiced frame as a template;
searching for a matching segment in adjacent frames whose cross correlation peak exceeds a predetermined threshold; and
aligning and merging the matching segments of the frame.

15. The system of claim 8 wherein stretching any unvoiced frame comprises automatically generating and inserting at least one synthetic segment into the current frame to increase a length of the current frame.

16. The system of claim 15 wherein automatically generating the at least one synthetic segment comprises:
automatically computing the FFT of the current frame;
introducing a random rotation of the phase into the FFT coefficients; and
computing the inverse FFT for each segment, thereby creating the at least one synthetic segment.

17. The system of claim 15 wherein automatically generating the at least one synthetic segment comprises:
applying at least one LPC filter to the current frame to compute an LPC residual;
computing at least one FFT from the LPC residual;
introducing a random rotation of the phase into the coefficients of at least one of the computed FFTs;
computing inverse FFTs from the FFT coefficients to reconstruct the LPC residual; and
applying at least one inverse LPC filter to the LPC residual, thereby creating the at least one synthetic segment.

18. The system of claim 8 wherein stretching any mixed frame comprises:
identifying at least one segment of the frame as a template;
searching for a matching segment whose cross correlation peak exceeds a predetermined threshold;
aligning and merging the matching segments of the frame to create an interim voiced segment;
automatically generating and inserting at least one synthetic segment into the current frame to create an interim unvoiced segment;
weighting each of the interim voiced segment and the interim unvoiced segment relative to a normalized cross correlation peak computed for the current segment; and
adding and windowing the interim voiced segment and the interim unvoiced segment to create a partially synthetic stretched segment.

19. The system of claim 8 wherein compressing any voiced frame comprises:
identifying at least one segment of the frame as a template;
searching for a matching segment whose cross correlation peak exceeds a predetermined threshold;
cutting out the signal between the template and the match; and
aligning and merging the matching segments of the frame.

20. The system of claim 8 wherein compressing any voiced frame comprises:
shifting a segment of the frame from a first position in the frame to a second position in the frame;
deleting the portion of the frame between the first position and the second position; and
adding the shifted segment of the frame to the signal representing the remainder of the frame by using a sine windowing function for blending the edges of the segment with the signal representing the remainder of the frame.

21. The system of claim 8 wherein both the predetermined minimum buffer size for stretching one or more decoded frames in the signal buffer and the predetermined maximum buffer size for compressing one or more decoded frames in the signal buffer are optimized to compensate for clock drift between an encoder and a decoder.

* * * * *